(12) United States Patent
Knaebel (10) Patent No.: US 7,594,956 B2
(45) Date of Patent: Sep. 29, 2009

(54) TEMPERATURE SWING ADSORPTION SYSTEM

(75) Inventor: Kent S. Knaebel, Plain City, OH (US)

(73) Assignee: Adsorption Research, Inc., Dublin, OH (US)

( * ) Notice: Subject to any disclaimer, the term of this patent is extended or adjusted under 35 U.S.C. 154(b) by 219 days.

(21) Appl. No.: 11/109,414

(22) Filed: Apr. 19, 2005

(65) Prior Publication Data

US 2006/0230930 A1 Oct. 19, 2006

(51) Int. Cl.
*B01D 53/08* (2006.01)

(52) U.S. Cl. .............................. 95/107; 95/115; 95/139; 96/146; 96/150

(58) Field of Classification Search ................... 95/107, 95/108, 109, 114, 115, 116, 129, 137, 139, 95/148; 96/123, 146, 150; 110/203
See application file for complete search history.

(56) References Cited

U.S. PATENT DOCUMENTS

| | | | | |
|---|---|---|---|---|
| 2,495,842 A | * | 1/1950 | Gilliland | 95/109 |
| 2,544,214 A | * | 3/1951 | Berg | 96/126 |
| 2,550,955 A | * | 5/1951 | Berg | 95/112 |
| 2,630,877 A | * | 3/1953 | Berg | 95/112 |
| 2,638,999 A | * | 5/1953 | Berg | 95/14 |
| 2,684,124 A | * | 7/1954 | Hines, Jr | 95/112 |
| 2,992,895 A | * | 7/1961 | Feustel et al. | 423/239.1 |
| 4,147,523 A | * | 4/1979 | Izumo | 96/126 |
| 4,259,094 A | * | 3/1981 | Nagai et al. | 96/123 |
| 4,451,272 A | * | 5/1984 | Mathewes et al. | 96/150 |
| 5,336,300 A | * | 8/1994 | Yoshino et al. | 95/96 |
| 5,730,782 A | * | 3/1998 | Heim et al. | 95/111 |
| 6,508,858 B2 | * | 1/2003 | Hirose, deceased et al. | 95/1 |

* cited by examiner

*Primary Examiner*—Frank M Lawrence
(74) *Attorney, Agent, or Firm*—Mueller Smith & Okuley, LLC (57) ABSTRACT

A method for removing one or more strongly adsorbed components (SAC) from a process gas stream having SAC and other gaseous components adjusts the temperature of the SAC-laden process gas stream to be between about 80° and about 500° C. The temperature-adjusted process gas stream is contacted with a heat-exchange surface to transfer heat to an adsorbent, thus causing adsorbed SAC to be desorbed for collection, and to cool the process gas stream and remove any condensate from the cooled process gas stream. The cooled process gas stream is contacted with a cooled section of the adsorbent to adsorb SAC therefrom, producing a SAC-depleted process gas stream and a SAC-laden adsorbent. Desorbed SAC is withdrawn for collection and any adsorbent fines are withdrawing for collection.

25 Claims, 4 Drawing Sheets

TEMPERATURE SWING ADSORPTION SYSTEM

CROSS-REFERENCE TO RELATED APPLICATIONS

None

STATEMENT REGARDING FEDERALLY SPONSORED RESEARCH

Not applicable.

BACKGROUND OF THE INVENTION

1. Field of the Invention

The present invention relates to an adsorber to capture and enrich carbon dioxide ($CO_2$) from flue gas and having a unique moving bed structure in which regeneration occurs by heating the adsorbent. This type of system is commonly referred to as temperature swing adsorption (TSA), since the adsorbent temperature is cycled synchronously during uptake and release. This particular type of TSA concept involves a moving bed of adsorbent. It offers significant advantages such as, for example, higher efficiency, lower thermal mass, lower heat loss, and lower cost than fixed bed (stationary adsorbent) systems employed to achieve the same end. This type of adsorber is especially well suited to applications where flue gas contains at least 3% carbon dioxide, and at least 1,000 standard cubic feet per hour of flue gas.

The present invention also relates to the removal of certain components from gas streams used in industrial applications, such as, for example, air containing $SO_2$, natural gas or landfill gas containing excess $CO_2$, air-drying, and separation of hydrocarbon mixtures.

2. Discussion of the Background

One problem of our modern society is energy production from combustion of fossil fuels, and the associated emissions. Though there remains some controversy, the two key problems associated with such emissions are acid rain and global warming.

For example, the presence of sulfur in some coal deposits leads to emissions of sulfur oxides ($SO_x$) with $SO_2$ being chief among them. Since the 1960s, $SO_x$ has been recognized as a contributor to so-called acid rain, which was blamed for devastation of forests, lakes, and agricultural output (http://www.epa.gov/airmarkets/acidrain/index.html, Dec. 17, 2004). Fortunately, measures have been taken to prevent $SO_X$ from reaching the environment.

In the 1990s, global warming, or more broadly, climate change, became recognized as a serious potential problem (http://yosemite.epa.gov/oar/globalwarming.nsf/content/index.html, Dec. 17, 2004). $CO_2$ is produced by combustion of fossil fuels, including coal and natural gas, and other hydrocarbon fuels including propane, liquefied petroleum gas (LPG), heating oil, landfill gas, gasoline, jet fuel, diesel fuel, and naphtha. $CO_2$ is called a greenhouse gas because, compared with the main constituents of air, it tends to admit solar energy but restricts heat loss from the surface of the earth.

Accordingly, many individuals, organizations, and even countries, feel $CO_2$ is mostly responsible for global warming or climate change, and they want to limit emissions of $CO_2$ into the atmosphere. At present, there is no economical means to collect $CO_2$ emissions from power plants or other point sources. The present invention pertains to capturing $CO_2$ from flue gas prior to its discharge into the atmosphere, though it applies to other gas separation applications, as well.

Coupled with the perceived problem of climate change is the gradual depletion of fossil energy sources, such as, for example, crude oil. Consequently, various techniques have been developed to enhance the recovery of crude oil from geologic reservoirs. One of the more promising enhanced crude oil recovery techniques is the injection of $CO_2$ into crude oil reservoirs that have been partly depleted using conventional primary techniques. This oil recovery technique is described in U.S. Pat. No. 3,442,332, and in other references. An inexpensive means to recover $CO_2$ from flue gas will improve the economics for extracting crude oil from existing reservoirs.

3. Background on Moving Bed Adsorbers

The most well known type of moving bed adsorber is used for capturing volatile organic compounds (VOCs) from air. Berg in U.S. Pat. No. 2,519,873; Murakami and Okamoto in U.S. Pat. No. 4,047,906; Jacquish in U.S. Pat. No. 4,869,3734; Dingfors in U.S. Pat. No. 4,902,311; Cioffi and Cowles in U.S. Pat. No. 5,676,738; and Vickery in U.S. Pat. No. 6,027,550, describe examples.

The Berg patent teaches separation of a gaseous mixture by selective adsorption, using an apparatus having an adsorption section and a stripping section. This patent was the basis of the so-called Hypersorber, used for fractionating hydrocarbon gases with activated carbon. The stripping section has a contacting part and a heating part, with regeneration occurring by combined action of heat and stripping gas (e.g., steam). There also is an elevator to convey regenerated adsorbent from the bottom of the stripping section to the top of the adsorption section. As reported by Treybal "Several adsorbers on a very large scale were built, but the very brittle carbon was subject to serious attrition losses, and no new continuous-flow, countercurrent device for plug flow of solids and gas is believed to be in operation." (Treybal, R. E., "Mass-Transfer Operations," $3^{rd}$ Ed., McGraw-Hill, New York, 1980). Additional information was reviewed by Wankat (Wankat, P. C., "Large Scale Adsorption and Chromatography," Vol. II, CRC Press, Boca Raton, 1986) who mentioned that, "Attrition losses were a problem, but could be reduced if modern spherical carbon beads were used."

The Murakami and Okamoto patent discloses an apparatus for purifying a waste gas containing pollutants. The apparatus is a tower comprised of an adsorbing section, containing trays with weirs, dividing each tray into two zones, and serving to regulate the lateral flow of adsorbent across the tray. Both zones are perforated, but the holes in one zone are too small for the adsorbent to penetrate, while the other zone allows adsorbent to fall to the tray below, into a zone through which it cannot pass. The gas was fed to the tower below the trays, and the adsorbent was fed to the top tray of the tower, resulting in overall countercurrent flow, though the adsorbent on any tray would be in cross-flow.

The Jacquish patent shows an adsorption system for treating air that is contaminated with solvent vapors (i.e., VOCs). The adsorption section contains parallel passages made of screen, through which the adsorbent falls, while the contaminated gas flows horizontally, which causes cross-flow between the gas and adsorbent. The adsorbent is collected from the parallel passages and transferred by gravity downwards to a desorber, where the VOCs are desorbed into a carrier gas, e.g., nitrogen. That gas is split and some of which flows vertically downwards in the same direction as the adsorbent, while the rest flows upwards more or less counter to the adsorbent. The net effect is cross-flow. The adsorbent is transferred via a conveyor to the top of the adsorption section.

The Dingfors patent teaches adsorption using a fluidized bed of macroporous polymeric particles through which passes air that is contaminated with solvent vapors (i.e., VOCs). The polymeric particles adsorb the solvent vapors, and are transported to a free-standing stripper (desorber), which effects desorption of the solvent by application of hot air, in countercurrent flow, while passing through a heat exchanger. The desorbed solvent vapors and air are cooled to condense the solvents for reuse.

The Cioffi and Cowles patent reveals another VOC recovery system in which the contaminated gas flows upwards and the adsorbent flows downwards, counter to the gas path. The adsorption section contains 1 to 20 sieve trays (perforated plates), which allow gas to flow upwards (through the perforations) and passageways (downcomers), which allow the adsorbent to pass downwards to the tray below. The adsorbent is transferred to the top of a free-standing desorber, where the VOCs are desorbed into a carrier gas, which flows counter to the solid, i.e., flowing upwards. The adsorbent is transferred pneumatically.

The Vickery patent discloses another VOC recovery system in which the contaminated gas flows upwards and the adsorbent flows downwards, counter to the gas path. The adsorption section contains two regions, which allow the adsorbent to be regenerated in separate, freestanding desorbers. Each adsorption region contains trays with weirs, which serving to regulate the lateral flow of adsorbent across the tray, and to the tray below. The trays are perforated, but the holes are too small for the adsorbent to penetrate. After passing through an adsorption region, the adsorbent is transferred to a free-standing desorber, where the VOCs are desorbed into a carrier gas, which flows to a freestanding thermal oxidizer. The adsorbent is transferred pneumatically back to the adsorption section.

D. Aaron and C. Tsouris from Oak Ridge National Laboratory recently published paper, "Separation of CO2 from Flue Gas: A Review," *Separation Science and Technology*, Vol 40, pp 321-348 (2005). The abstract states, "Upon completion of this review, it was concluded that the most promising current method for $CO_2$ separation is liquid absorption using monoethanolamine (MEA)." It goes on to say that certain membrane processes might be appealing, "potentially more efficient at separation than liquid absorption," and that other methods [e.g., adsorption] "are either too new for comparison or appear unlikely to experience significant changes to make them desirable for implementation."

4. Background on Other Carbon Dioxide Capture Technologies

Capture technologies can be divided into two broad categories: post-combustion capture technologies (so called end-of-pipe capture Of $CO_2$ from flue gases), and pre-combustion capture technologies ($CO_2$ capture by fuel conversion via chemical reactions). The first category includes absorption (e.g., with mono-ethanol-amine), adsorption (either pressure swing or temperature swing), and membrane separation. The second category includes coal gasification, i.e., by partial oxidation, which produces syngas: mostly carbon monoxide (CO) and hydrogen ($H_2$). The CO and $H_2$ then are separated and combusted in a controlled environment releasing almost pure $CO_2$ and $H_2O$. Alternatively, the carbon can be removed as the syngas is formed, via carbonation of metal oxides such as calcium, magnesium, or others, in order to produce hydrogen. Another pre-combustion approach is called oxygen combustion capture (or sometimes called oxyfuel), which involves separation of air (to remove nitrogen) in order to obtain relatively pure oxygen ($O_2$), which is mixed with recycled $CO_2$ to avoid excessive temperature.

When the Department of Energy considers the hypothetical question, "What capture technology can be used at my local power plant?", the answer is: "In the future, emerging R&D will provide numerous cost effectives technologies for capturing carbon dioxide from power plants. At present, however, state-of-the-art technologies for existing power plants are essentially limited to 'amine absorbents'." (http://www.netl.doe.gov/coal/Carbon%20Sequestration/Resources/faqs.html, Jan. 5, 2005). That source goes on to explain the basic concept of absorption: "The process works as follows. Flue gas that would normally go out the stack is bubbled through a solution of water and amines. The amines in the water react with the carbon dioxide in the flue gas to form an intermediate chemical called a rich amine. The rich amine is soluble and stays in the water solution. Some of the flue gas bubbles out of the top of the amine solution and is emitted to the air just like the flue gas was before, but a portion of the carbon dioxide has reacted with the amines and remains in solution. The rich amines are pumped to another vessel where they are heated to make them decompose back into regular (lean) amines and carbon dioxide gas. The pure carbon dioxide gas is collected from this vessel and the regular amines are recycled to the flue contactor gas vessel."

Any of these other technologies that rely on compression or evacuation (e.g., pressure swing adsorption, membrane processes, and some versions of absorption), are hindered by the inherent cost of that operation. An illustration of the inherent cost, which is unavoidable for is the power requirement.

$$\text{Power} = \frac{\gamma}{\gamma - 1} \frac{QRT}{\eta} \left[ \left( \frac{P_H}{P_L} \right)^{\frac{\gamma-1}{\gamma}} - 1 \right] \quad (1)$$

If the flue gas must be compressed in order to treat it (e.g., via a membrane unit), the power cost will depend on the required pressure. For example, if $CO_2$ is collected from a cement plant, at a effluent mole fraction of 0.1478, and an overall flow rate of 243.1 thousand standard cubic feet per minute (corresponding to an emission rate of 3,000 tons of $CO_2$ per day), and if the pressure required is 44.1 psig (starting at atmospheric pressure), the power required would be about 30 MW. If power costs $0.05 per kWh, the cost would be about $11.86 per ton of $CO_2$ captured. Likewise, if vacuum must be used to collect the concentrated $CO_2$, the cost will depend on the extent of evacuation. For example, for the same cement plant and basic power cost, if only the 3,000 tons of $CO_2$ per day were collected at 1.0 psia and compressed only to atmospheric pressure, the power required would be about 10 MW. The cost per ton of $CO_2$ would be about $4.17. Note that for both of these illustrations, the cost cited only represents the cost of the power, not the cost of the equipment to pump the gas, nor the cost of the device to perform the separation.

5. Adsorbent Selection

Figure 2:
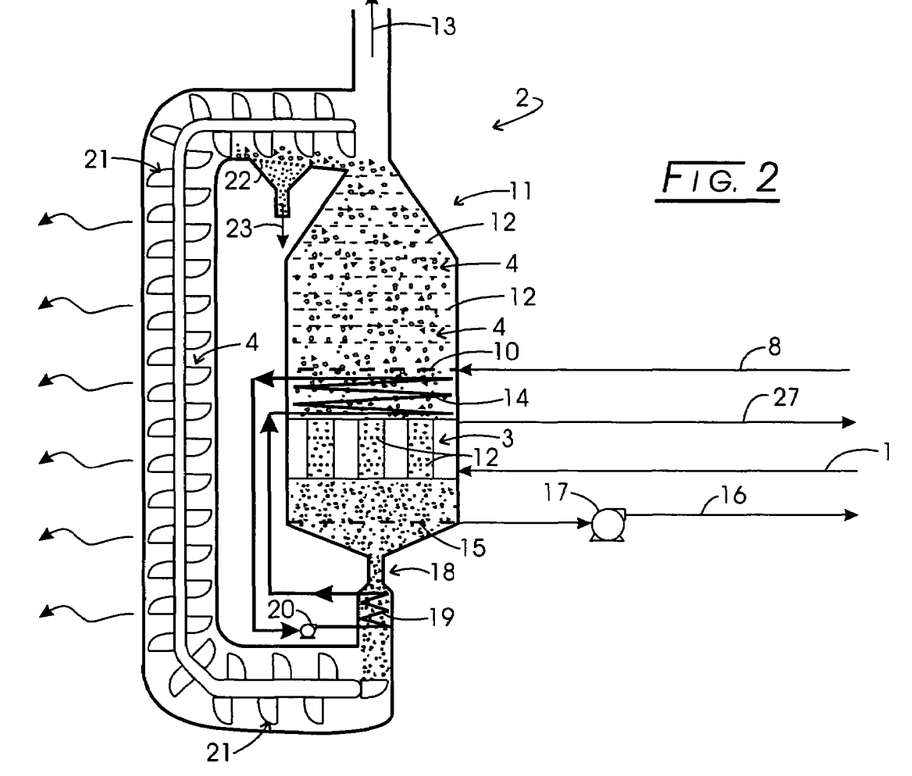
FIG. 2 schematically represents an apparatus and flow diagram for implementing a second embodiment of the present invention.
Figure 3:
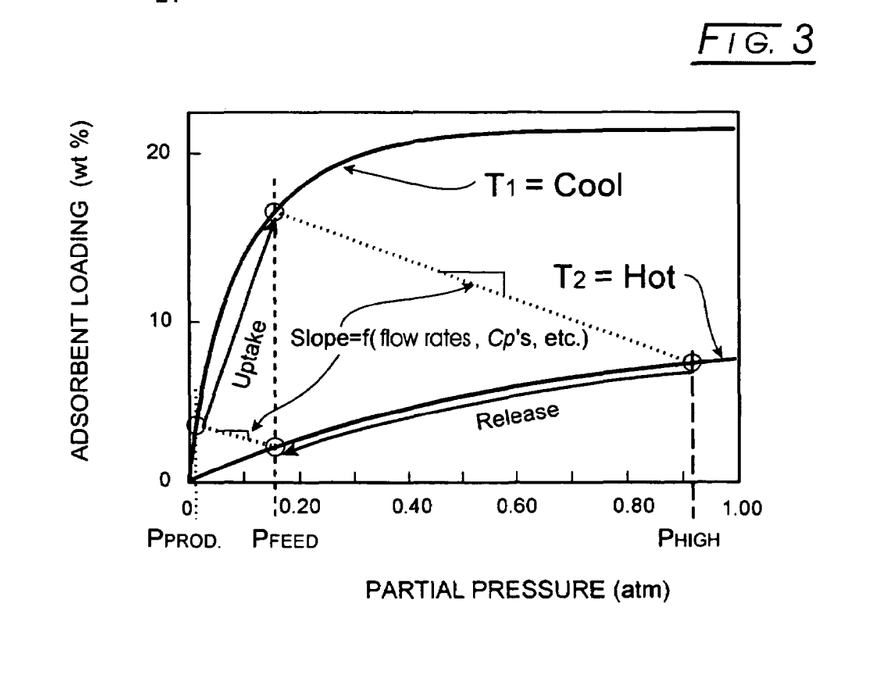
FIG. 3 represents the generalized response of an adsorbent to changes in temperature and concentration of a strongly adsorbed component, in this case of $CO_2$.
Figure 4:
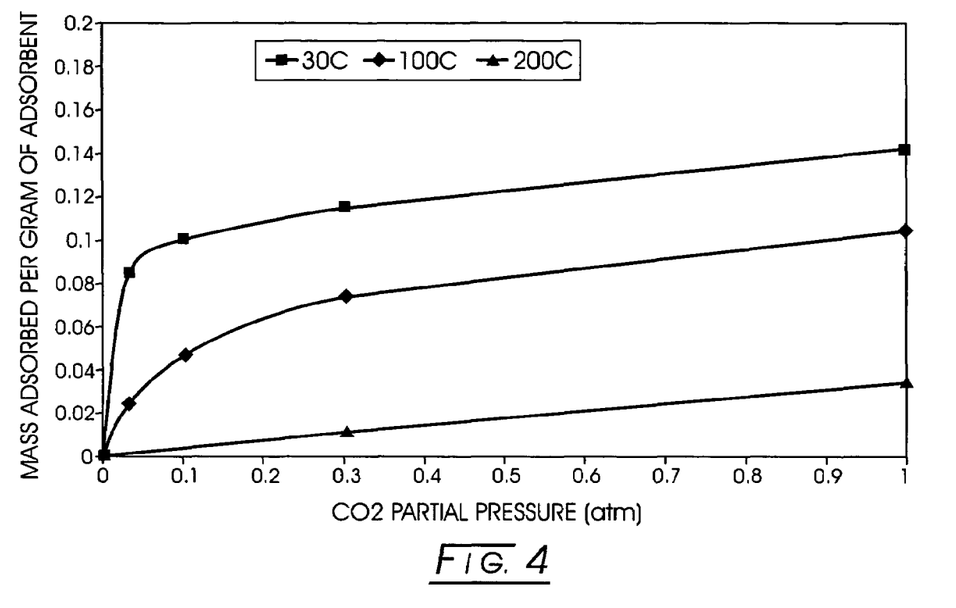
FIGS. 4 and 5 represent sets of actual isotherms for Zeolite 4A and Zeolite 13X, respectively, and 3 isotherms for each adsorbent.
Figure 5:
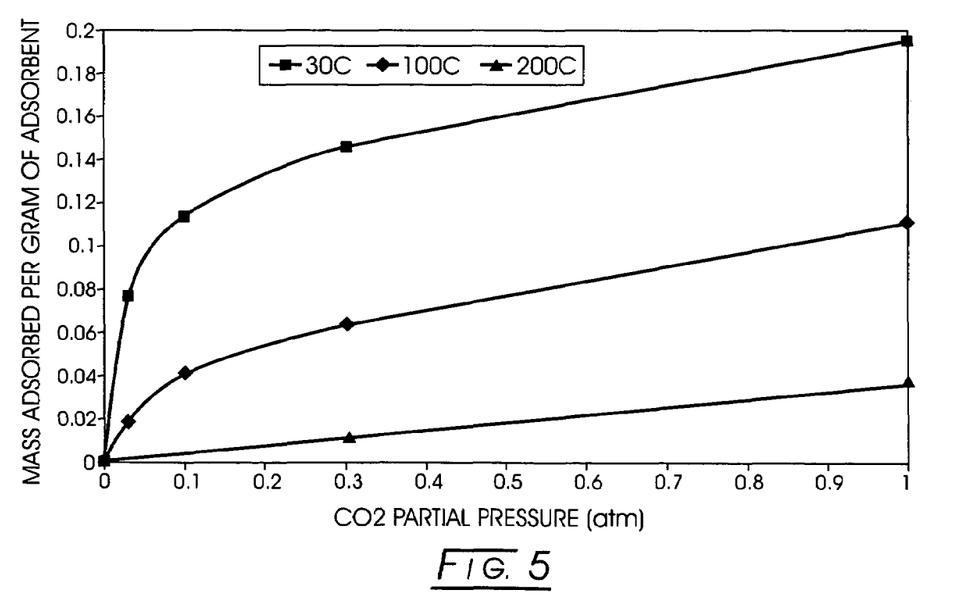

The most important attributes of an adsorbent for any application are: working capacity (change in loading of the desired strongly adsorbed component(s) between the uptake step and release step, as shown in FIG. 2), selectivity (ability to adsorb the desired strongly adsorbed component(s) and not to adsorb other components that are not desired), kinetics (speed of uptake and release of the desired strongly adsorbed component(s)), durability (ability to withstand the stresses in a moving bed adsorption system over many circuits or cycles), compatibility (suitable inertness, i.e., resistance to degradation or poisoning by contaminants in the feed mixture, and to decomposition of those or other contaminants), and cost (i.e., suitably low in order that the entire process is economical). The overall performance and economic benefits of the process depend on all of these.

Suitable adsorbents for this application are those having reasonably large working capacity over the relevant temperature range and composition range, good selectivity for $CO_2$ over other undesired constituents (such as $N_2$ and $O_2$), good kinetics, high durability, good compatibility, and reasonably low cost. Several adsorbents are potential candidates for $CO_2$ capture. For example, molecular sieves are materials whose atoms are arranged in a lattice or framework in such a way that a large number of interconnected uniformly sized pores exist. The pores generally only admit molecules of a size about equal to or smaller than that of the pores. Molecular sieves, thus, can be used to adsorb and separate or screen molecules based on their size with respect to the pores. One class of molecular sieves is zeolites. Zeolites are hydrated silicates of aluminum and frequently contain cations, which are exchangeable. Zeolites can be naturally occurring or artificial. Naturally occurring types include chabazite, clinoptilolite, erionite, heulandite, and mordenite, to name but a few. Artificial zeolites include, inter alia, types A, D, L, R, S, T, X, Y, ZSM, mordenite, or clinoptilolite. Most specific varieties of those include a numerical designation or the abbreviation of the predominant cation.

Several zeolite candidates for separating carbon dioxide from flue gas were studied by Harlick and Tezel, including zeolites 5A, 13X, NaY, and ZSM-5 (Harlick, P. J. E. and F. H. Tezel, "An Experimental Screening Study for $CO_2$ Removal from $N_2$," *Mesoporous and Microporous Materials*, 76, 71-79 (2004)). In addition to those, some types of activated alumina, silica gel, 4A zeolite, and activated carbon are plausible choices, according to the characteristics listed above, but depending on the product specifications, and the operating conditions for a specific application.

"Adsorbent" for present purposes, then, comprehends a porous solid, particulate material or mixture of materials, which selectively admits and retains within its pores (or adsorbs) one or more components from a mixture containing at least one other component. The mixture in this case is a process gas contaminated therewith, such as those adsorbents discussed infra. While the term "adsorbent" will be used often for convenience of description, a porous solid, particulate material, often ranging in size from about 0.1 mm to 10 mm is meant and should be understood by the skilled artisan. Too, use of the term "particulate adsorbent" or "solid adsorbent" also refers to "adsorbent", as defined herein.

BRIEF SUMMARY OF THE INVENTION

A method for removing one or a plurality of strongly adsorbed components (abbreviated "SAC", whether singular or plural), e.g., $CO_2$ from a process gas stream, e.g., combustion products commonly called flue gas, which comprises the steps of:

Option 1: Process Gas is Heat Source:
(a) temperature of the process gas stream is between about 80° and about 500° C.,
(b) contacting process gas stream with a heat-exchange surface, in thermal contact with a adsorbent; said heat-exchange surface to transfer heat from said process gas stream to said adsorbent, and to cool said process gas stream and possibly removing condensate from said process gas stream, should the dewpoint temperature be reached;
(c) optionally passing said cool process gas stream in contact with an external heat exchanger surface through which, on the opposite side, a coolant passes, producing a further cooled process gas stream, between about −20° and about 120° C.;

Option 2: Ancillary Hot Media is Heat Source:
(a) employ ancillary hot media (e.g., steam condensate, effluent of an exothermic reaction, geothermal fluid) between about 80° and about 500° C.,
(b) contacting ancillary hot media with an optional first heat-exchange surface, in thermal contact with a adsorbent; said heat-exchange surface to transfer heat from said process ancillary hot media to said adsorbent, and to cool said ancillary hot media;
(c) provide process gas stream, between about −20° C. and about 120° C.;

For Either Option:
(d) passing said process gas stream, between about −20° C. and about 120° C., in direct contact with a cooled section of said adsorbent to adsorb SAC therefrom, producing a SAC-depleted process gas stream;
(e) partially heating said adsorbent via thermal contact with an optional second heat-exchange surface, the opposite side of which is in contact with a fluid that has been heated by the hot adsorbent via thermal contact with a subsequent heat-exchange surface, and which is subsequently circulated;
(f) fully heating said adsorbent via in thermal contact with said second optional heat-exchange surface, as described in step (b), thus causing adsorbed SAC to be desorbed and withdrawing desorbed SAC for collection;
(g) passing said SAC-depleted adsorbent, from step (f) into contact with a heat-exchange surface, the opposite side of which is in contact with a fluid that has been cooled by the cool adsorbent via thermal contact with the previous heat-exchange surface from step (e), and which is subsequently circulated;
(h) to cool it sufficiently for return to step (c) of the process; and
(i) withdrawing any fines for collection.

The invention, then, is a multi-step process for removing $CO_2$ from a process gas stream having $CO_2$ and other gaseous components commences by adjusting the temperature of a $CO_2$ laden process gas stream to be between about 80° and about 500° C. The temperature adjusted process gas stream is contacted with a heat-exchange surface to transfer heat to a adsorbent, thus causing any adsorbed $CO_2$ to be desorbed for collection, and to cool said process gas stream and removing any condensate from said cooled process gas stream. The cooled process gas stream is passed in contact with a cooled section of said adsorbent to adsorb $CO_2$ therefrom, producing a $CO_2$ depleted process gas stream. The desorbed $CO_2$ is withdrawn for collection. The $CO_2$ depleted process gas stream optionally is passed into contact with heated regenerated adsorbent to cool it sufficiently for return of the process. Finally, any fines are withdrawn for collection.

Previous attempts to achieve countercurrent moving-bed adsorption have been hindered by adsorbent attrition, e.g., as noted regarding the Hypersorber. Some have attempted to reduce attrition by making stronger, tougher adsorbent. That can be a useful approach, but such adsorbent may exhibit poor uptake and release kinetics, on account of using extra binder, or tougher and less porous binder. The present invention suggests, inter alia, two features to minimize the effect of attrition. One feature is a means to remove adsorbent fines (debris) continuously, to prevent its accumulation in the vessel, where it could interfere with flow of both the gas and adsorbent and could exacerbate attrition due to its abrasive nature. Another feature is intended to reduce the tendency for attrition to occur, which is considered by many to be a mystery. Chou, for example, says "attrition [and other topics] make granular materials an interesting research subject." (Chou, C-S, Proc. Natl. Sci. Council, ROC(A), Vol. 24, No. 5, pp. 317-329 (2000)). Similarly, the website for the Computational Laboratory for Electromagnetics and Solid Mechanics at the Univ. of Florida says, "The flow of granular materials is crucial in many areas of engineering for moving materials from one place to another. Yet, the mystery in behavior of granular flows is still not well understood." (http://aemes.mae.ufl.edu/~vql/clesm/clesm_gran_flow. html; Jan. 22, 2005). Part of the reason for the apparent gap in understanding of this problem is that most experts concerned with solids flow are interested in chutes, hoppers, pneumatic conveying systems, rotary kilns, fluidized beds, blenders, storage, vibratory motions, whirling, oscillations, pitching, and very slow deployment. In contrast, the present application is mainly concerned with relatively slow, countercurrent plug flow of a solid and gas, and heat transfer between a solid stationary surface and the moving adsorbent. For both solid and gas, the speed must be sufficiently slow to attain adequate residence time and thereby to achieve nearly complete uptake and release in a restricted volume. Hence, the present objective is considerably different from the objectives of most other solid flow applications.

Yet, this invention is based on the following, discovered principle, viz., that adsorbent attrition in moving bed designs is largely a function of friction (shear) forces, and to a lesser extent normal forces. Consequently, to minimize adsorbent attrition, it is important to minimize shear stresses and only to allow normal forces that are substantially less than the crush strength. When a solid particle moves while in contact with a stationary solid surface and other adsorbent particles, it tends to rotate, due to friction on account of contact with the stationary surface, and that generates shear stress between the moving particle and the other particles contacting it. Likewise, that shear stress exerted by the other particles may tend to restrict the rotation of the first particle, and may tend to cause it to slide, rather than rotate, across the stationary surface, which is a related form of shear stress. The magnitude of the shear stress depends on the applied normal force.

It is a well-known principle of fluid and solid mechanics that the height of a column of particles above a particle (i.e., the so-called hydrostatic "head") affects the normal force on the particle, and in turn that affects the shear stress (which is the shear force divided by the contact area), if the particle is moving relative to another particle or surface. In that vein, the invention realizes that it is necessary to limit the height of adsorbent, e.g., by introducing perforated plates at relatively short vertical intervals, which distribute the normal force, and if sized properly, prevent accumulation of normal force in a column of moving adsorbent. To illustrate, the normal force on a particle at the bottom of a 10 foot high column of adsorbent, which has properly sized perforated plates spaced at 1 foot intervals, will be closer to that of adsorbent in a 1 foot high column of adsorbent than if it were a 10 foot high continuous column of adsorbent.

The effect of shear stress is severe for particles that are spherical beads, since those tend to contact neighboring particles and adjacent solid surfaces nearly at a single point (or very small fraction of the total surface area); hence, the normal force exerted at that point results in a very high pressure (normal force/contact area), which produces a correspondingly high shear stress. Since it is the nature of moving bed adsorbent systems for all of the adsorbent to pass through the region where shear forces are highest while completing each pass through the system, it is critical to ensure that the highest shear force is appropriately low, to keep the cumulative effects of shear (and attrition) to an acceptable level.

BRIEF DESCRIPTION OF THE DRAWINGS

For a fuller understanding of the nature and advantages of the present invention, reference should be had to the following detailed description taken in connection with the accompanying drawings, in which.

The drawings will be described further below.

DETAILED DESCRIPTION OF THE INVENTION

Figure 1:
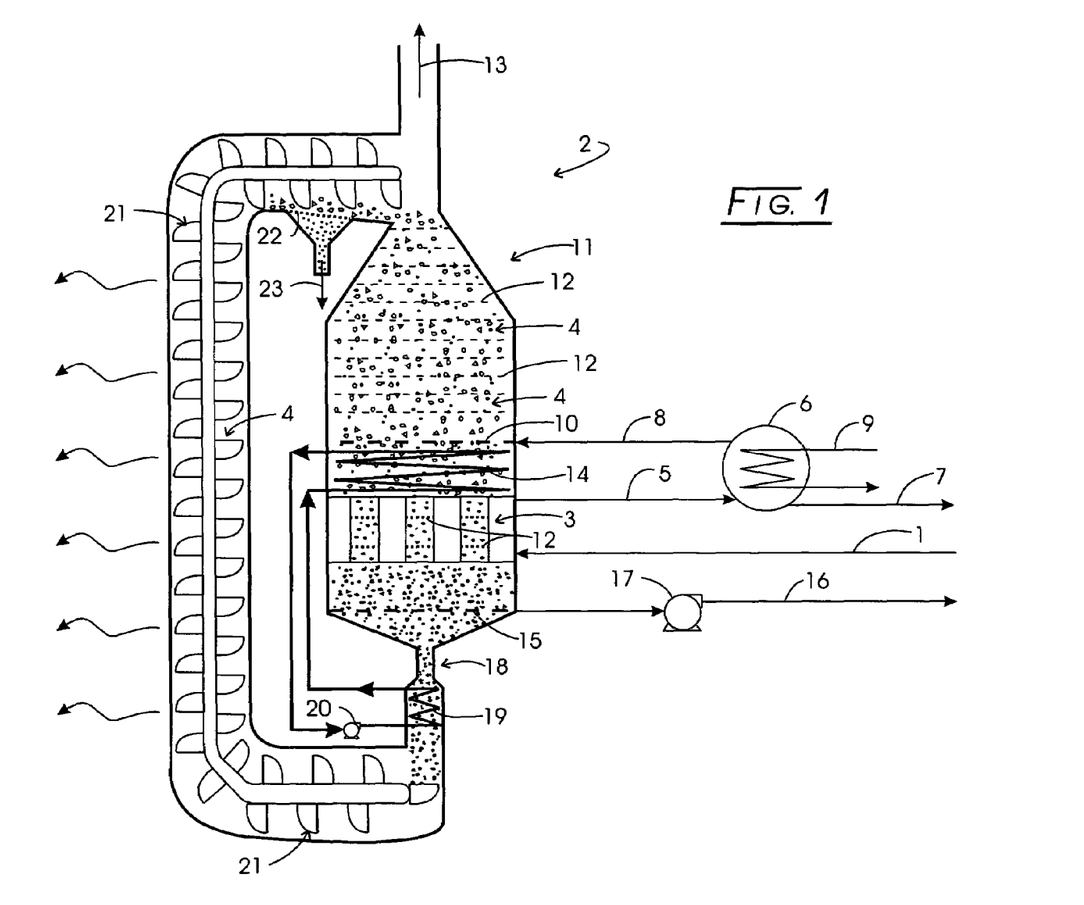
FIG. 1 schematically represents an apparatus and flow diagram for implementing one embodiment of the present invention.

The novel adsorption system depicted in FIG. 1 preferably treats a hot process gas stream. The hot process gas, 1, comprises one or more strongly-adsorbed components, SAC, e.g., carbon dioxide, and a carrier gas, which comprises one or more weakly-adsorbed components (e.g., nitrogen).

The adsorption system includes the following process steps.

The process gas stream, which is at or treated to have a temperature of between about 80° C. and about 500° C., is introduced to the adsorber vessel, 2. More particularly, the gas enters the gas-side of a heat-exchanger section, 3, and is in contact with one side of its surface. The opposite side of that surface is in thermal contact with a adsorbent, 4. The heat-exchanger section may be comprised of parallel plate passages, an assembly of tubes in a shell, or any other device to physically isolate the hot process gas from the adsorbent. The heat-exchange surface is to transfer heat from process gas stream 1 to adsorbent 4, thereby producing a cooled process gas stream, 5, and possibly providing a means for removing condensate from said cooled process gas stream, should the dewpoint temperature be reached.

Cooled process gas stream 5 optionally may pass in contact with an external gas cooler, 6, through which, on the opposite side, a coolant, 9, passes, producing a cool process gas stream, 8, between about −20° C. and 120° C. (corresponding to $T_1$ in FIG. 2); external gas cooler 6, which may collect and remove condensate, 7, from cool process gas stream 5, should the dewpoint temperature be reached.

Referring to FIG. 2 where like numerals are used to indicate similar/identical components, the novel adsorption system depicted in FIG. 1 optionally may treat cool process gas stream 8, between about −20° C. and 120° C. (corresponding to $T_1$ in FIG. 2), and employ an ancillary hot media as the heat source. The ancillary hot media would be an inexpensive or convenient source of heat, such as, for example, steam condensate, effluent of an exothermic reaction, or geothermal fluid, between about 80° and about 500° C. It would be substituted for hot process gas stream 1. It would be introduced to adsorber vessel 2 more particularly, to the gas-side of heat-exchanger section 3, where it comes into contact with one side of its surface. The opposite side of that surface is in thermal contact with adsorbent 4. The heat-exchange surface is to transfer heat from said ancillary hot media to said adsorbent, thereby producing cooled ancillary media 27. Cooled ancillary media 27 would be exhausted. The cool process gas stream comprises one or more SAC and a carrier gas, which comprises one or more weakly-adsorbed components (e.g., nitrogen).

The adsorption system includes the following process steps.

Cool process gas stream 8 passes into adsorber vessel 2 through a gas distributor, 10, within adsorption section, 11, of adsorber vessel 2 such that gas is in direct contact with a cooled section of adsorbent 4, while the former passes upward and the latter passes downward, countercurrently, through a series of perforated trays, 12. The purpose of the trays is to promote contacting of the gas and adsorbent. Perforated trays are suggested, which permit passage of both adsorbent and gas through the perforations, though various methods of enhancing the contact of the solid and gas are possible, with the objective of maximizing adsorption of SAC. The design of these trays involves several considerations. For example, the perforations must be of an adequate diameter and spacing, and the trays must be spaced vertically to allow adequate residence time of the adsorbent in the adsorber vessel, as well as adequate mass transfer, reasonable pressure drop of the gas, and reasonable freedom from accumulation of debris, such as adsorbent fines. Other design considerations of the trays will affect their vibration, weight, required maintenance, as well as physical or chemical deterioration, e.g., via corrosion or erosion, or other mechanical problems, and ultimately their cost. The purpose of such contacting of the gas and adsorbent is to produce a SAC-depleted process gas stream 13, and a SAC-enriched adsorbent stream, which proceeds, propelled by gravity, towards a heat-exchange surface, 14. The SAC-enriched adsorbent stream is partially heated via thermal contact with said heat-exchange surface, the opposite side of which is in contact with a fluid, which has been heated by the hot adsorbent via thermal contact with a subsequent heat-exchange surface, and which is circulated between the two surfaces. The SAC-enriched adsorbent stream achieves full heating, corresponding to $T_2$ in FIG. 2, via thermal contact with internal heat exchanger 3, as described. The effect of heating causes adsorbed SAC to be desorbed, following the principle shown in FIG. 2, yielding a SAC-depleted adsorbent.

The desorbed SAC are drawn through the gas collector, 15, in stream 16, by a mechanical means, 17 (e.g., a blower), under slight suction, relative to the pressure at which process gas is admitted to the adsorption vessel. The pressure must be sufficiently low to remove the adsorbed SAC, but not so low so as to cause much carrier gas to be withdrawn. The SAC-depleted adsorbent proceeds downward, propelled by gravity, through a restriction, which permits the adsorbent to flow through it, but restricts the flow of SAC downwards and the bulk movement of extraneous gases, such as air, upwards, into the desorber section. After passing through said restriction, which may be passive, e.g., a long, narrow passageway, or a rotary interlock, said SAC-depleted adsorbent proceeds downwards, propelled by gravity, towards a heat-exchange surface, 19. The opposite side of which is in contact with a fluid, which passed through heat exchanger 14 and, thereby, was cooled and circulated via pump, 20. Subsequently, the SAC-depleted adsorbent is propelled by gravity into a conveyor, 21, e.g., a bucket elevator, pneumatic conveyor, or some other means, which carries the adsorbent to the top of adsorber vessel 2. While being conveyed, the SAC-depleted adsorbent may be cooled further by transferring heat to the surroundings, to cooled SAC-depleted gas, or to a coolant, which may be circulated through a jacket or tubing in the conveyor housing. If cooled SAC-depleted gas is employed for cooling, the gas may be induced to flow from the top of the adsorption section, countercurrent to the conveyed adsorbent in a bucket conveyor, by propelling it toward the bottom by means of a blower. In which case, the SAC-depleted gas is subsequently exhausted. Adsorbent, having been depleted of the SAC, and upon cooling fully completes the regeneration. As the regenerated adsorbent is delivered to the top of the adsorber vessel, it may optionally pass over a screen or a size-selective sieve, 22, which is designed to pass any fines which may have formed in the adsorber vessel, but to retain the whole adsorbent particles, which proceed to flow, propelled by gravity, into the top of the adsorber vessel, onto the series of perforated trays 12. The fines, if any, are collected and removed as stream 23.

It will be noticed that since the pressure differences through which the process gas flows are relatively small, it is important for the adsorption vessel to be a substantially gas-tight enclosure. It also will be appreciated that other constituents besides $CO_2$ can be removed (i.e., as SAC) from flue gas. Examples of such other constituents are $NO_X$, $SO_X$, mercury, and other noxious substances. The tendency for such constituents to be removed depends on the adsorbent, conditions (temperatures, pressures, and flow rates), and heat transfer characteristics.

Process Ingredients and Conditions

Condition (I)

The adsorbent is one or more of, inter alia, a molecular sieve (so named because of their ability to screen molecules based on their size), zeolite (specific type of molecular sieve), an alumino-silicate, an activated alumina, a silica gel, a porous metal oxide, an activated carbon, or a blend of such materials. In addition, the adsorbent may be impregnated with a substance to enhance its ability to adsorb selectively the SAC. The particle size of the adsorbent is conventional for such types of operations. The type of material, size, and other properties would be selected based on considerations such as those outlined in "BACKGROUND OF THE INVENTION," under "Section 5. Adsorbent Selection." The particle shape may be, for example, granules, pellets, or beads, but the preferred form is beads.

Condition (II)

The method of contacting is a moving bed adsorber, that is, the adsorbent and gas both move, generally countercurrent to each other. Upon reaching the bottom of the adsorber vessel, the adsorbent may be moved upwards mechanically, e.g., via conveyor, or pneumatically. It is important to prevent the cool process gas from entering the internal heat exchanger, i.e., by flowing downwards, and to prevent the desorbed SAC from entering the adsorption section of the adsorber vessel, and these objectives can be achieved by manipulating pressures, e.g., by using blowers and/or valves to control the flow rates and pressures of the gas streams, or by choking the flow of adsorbent in order to increase flow resistance of gas therethrough.

Condition (III)

Alternatively, the method of contacting is a simulated moving bed adsorber, that is, the adsorbent is stationary, but valves, which direct the gas flow are manipulated to have the effect that the adsorbent moves generally countercurrent to the gas. Different fixed beds accomplish different purposes, e.g., uptake, release, and cooling.

While the invention has been described with reference to a preferred embodiment, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In this application all units are in the metric system and all amounts and percentages are by weight, unless otherwise expressly indicated. Also, all citations referred herein are expressly incorporated herein by reference.

Now, the present invention will be described more completely with reference to specific examples. It should be noted that the present invention is not limited in any way by these examples.

EXAMPLES

Figure 6:
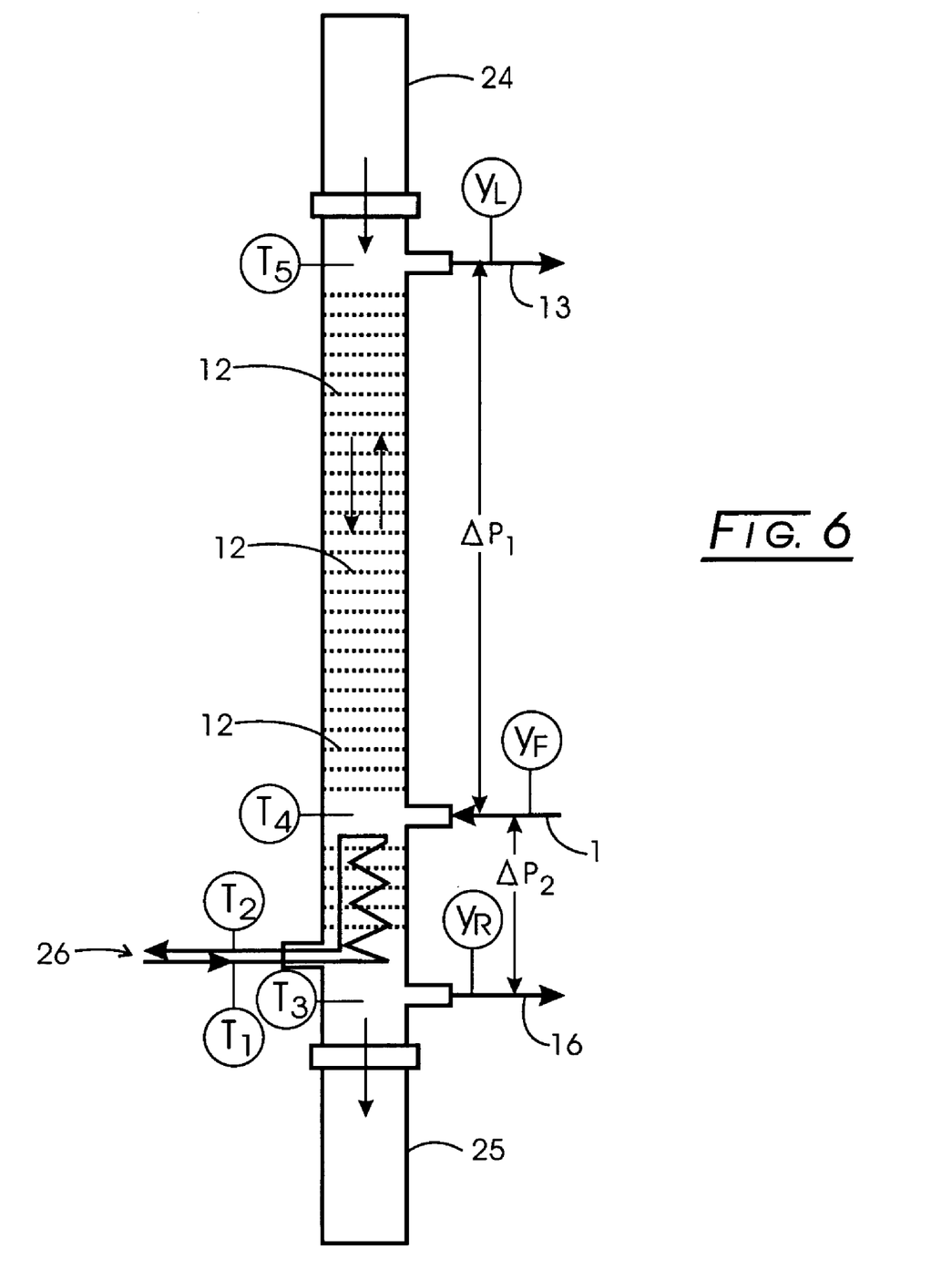
FIG. 6 represents the apparatus used in connection with the Example.

An experimental apparatus was assembled to test the basic concepts of this invention, and is shown in FIG. 6 with the reference numerals corresponding to those in FIGS. 1 and 2. The purpose of the example is to remove $CO_2$ from simulated flue gas. In this case, $CO_2$ is the SAC. The example, and in particular, the apparatus does not does not fully embody some of the mechanical features of the invention, which are impractical to employ on a laboratory scale. For example, it does not employ a conveyor (21 in FIG. 1) in the ordinary sense of the word. Rather reservoirs were constructed that could be interchanged, so as the adsorbent supply reservoir, 24, a collection reservoir filled, 25, and by employing a spare, it was possible to operate virtually without interruption. In addition, it was not practical to employ a combustion source for heat, but rather a hot oil heat source, 26, was circulated through the heat exchanger, as described under "Option 2: Ancillary hot media is heat source," in the section, "BRIEF SUMMARY OF THE INVENTION." Despite that, it was possible to perform an energy balance, and no substantial difference in performance arises on account of the source of the energy for regeneration, though employing the inherent energy contained in flue gas to enable regeneration and recovery of $CO_2$ offers economic benefits. The laboratory device also did not include internal heat exchangers (items 14 and 19 in FIG. 1). The purpose of the tests was to reduce to practice the major features of this invention, not to conserve energy or to operate at the minimum possible cost. Experimental data are listed below and in Table 1.

Common Experimental Conditions

Adsorbent: Zeochem Z4-04, 4A zeolite, beaded, average diameter=1.46 mm (Zeochem, AG)
Feed gas $CO_2$ mole fraction=$y_F$=0.153 Feed gas flow rate=20.95 std liters per minute, Adsorbent mass flow rate=$m_{ads}$=0.222 kg/min=0.4881 lb/min. Heat source (hot mineral oil) flow rate=67.7 g/min.

Column diameter=7.4 cm=2.91 in. Adsorber section (glass) length=1.22 m=4.0 ft. Number of trays in Adsorber section=49. Regeneration section (glass) length=0.61 m=2.0 ft. Number of trays in Regeneration section=17. Perforated plates: hole diameter=0.47 cm=0.187 in, spacing=0.81 to 0.97 cm=0.32 to 0.38 in.
Ambient pressure=0.9866 bar=14.31 psia. Ambient Temperature=18° C.

TABLE 1

Experimental Data

| Test | Temperature (° C.) | | | | | $y_R$ | $y_L$ | $CO_2$ | ΔP (psid × 10³) | |
|---|---|---|---|---|---|---|---|---|---|---|
| | 1 | 2 | 3 | 4 | 5 | | | Yield | 1 | 2 |
| 1 | 239 | 171 | 168 | 29 | 18 | 0.990 | 0.019 | 0.89 | 7 | 7 |
| 2 | 235 | 116 | 103 | 32 | 18 | 0.900 | 0.018 | 0.90 | 7 | 7 |
| 3 | 237 | 105 | 91 | 31 | 18 | 0.607 | 0.012 | 0.94 | 12 | 13 |
| 4 | 233 | 106 | 92 | 34 | 18 | 0.545 | 0.014 | 0.93 | 9 | 7 |
| 5 | 246 | 105 | 95 | 41 | 39 | 0.638 | 0.030 | 0.84 | 8 | 11 |
| 6 | 237 | 107 | 92 | 51 | 41 | 0.622 | 0.025 | 0.87 | 12 | 14 |
| 7 | 245 | 110 | 102 | 42 | 41 | 0.670 | 0.059 | 0.67 | 12 | 12 |
| 8 | 227 | 112 | 95 | 46 | 36 | 0.600 | 0.029 | 0.85 | 10 | 12 |

The yield of $CO_2$, i.e., the ratio of the amount captured in the $CO_2$-rich stream to that admitted in the feed, varied from 67% to 94%, while the mole fraction of $CO_2$ in the rich stream, $y_R$, varied from 54.5% to 99%.

The data showed that the yield of $CO_2$ depends strongly on the composition of the $CO_2$-lean stream, while the mole fraction of $CO_2$ in the rich stream depends strongly on the temperature at the extraction point, $T_3$ (shown in FIG. 6). It is possible to control the amount of $CO_2$ in the $CO_2$-lean stream by controlling the ratio of the feed gas and adsorbent flow rates, by providing adequate residence time for the adsorbent in the adsorbing section, by regenerating the adsorbent thoroughly in the preceding pass through the adsorber vessel, and by allowing adequate contact of the gas and adsorbent phases in the adsorber section. It is possible to adjust the temperature at the extraction point by providing more or less heat exchanger area, by controlling the flow rate (or residence time) of the adsorbent in the heat exchanger, and/or by controlling the flow rate or temperature of the heat source. Those, in turn, affect the amount of $CO_2$ in the $CO_2$-rich stream.

Throughout the experiments, which spanned six days, very little dust was observed in the glass sections of the column. It appeared that the cumulative attrition of the adsorbent was negligible.

I claim:

1. A temperature swing adsorption method for removing one or more strongly adsorbed components (SAC) from a process gas stream having SAC and other gaseous components in a sealed continuous flow sealed vessel, which comprises the steps of:
    (a) adjusting the temperature of a SAC-laden process gas stream to be between about 80° and about 500° C.,
    (b) in said sealed vessel containing a plurality of horizontally disposed perforated trays through which perforations both gas and solids can pass simultaneously, taking the temperature-adjusted process gas stream and contacting with a heat-exchange surface to transfer heat to an adsorbent passing through said sealed vessel and countercurrently to said temperature-adjusted process gas stream, thus causing adsorbed SAC to be desorbed for collection, and to cool said process gas stream and removing any condensate from said cooled process gas stream;

(c) contacting said cooled process gas stream with a cooled section of said adsorbent to adsorb SAC therefrom, producing a SAC-depleted process gas stream and a SAC-laden adsorbent;

(d) withdrawing desorbed SAC from step (b) for collection; and (e) withdrawing any adsorbent fines for collection.

2. The method of claim 1, which additionally comprises the step of:

(c1) passing said cool process gas stream from step (c) in contact with an external heat exchanger surface through which, on the opposite side, a coolant passes, producing a further cooled process gas stream, between about −20° to 120° C.

3. The method of claim 1, further comprising the step of:

(f) passing said SAC-depleted process gas stream from step (c) into contact with heated regenerated adsorbent from step (b) to cool said regenerated adsorbent sufficiently for return of said adsorbent to step (c) of the process.

4. The method of claim 3, further comprising the step of:

(g) contacting said regenerated adsorbent from step (f) with additional coolant to further cool said regenerated adsorbent for its return of said adsorbent to step (c) of the process.

5. The method of claim 1, wherein said adsorbent is one or more of a molecular sieve, alumina, silica gel, activated carbon, or a zeolite.

6. The method of claim 5, wherein said zeolite adsorbent is one or more of types A, D, L, R, S, T, X, Y, ZSM, mordenite, or clinoptilolite.

7. The method of claim 6, wherein said zeolite adsorbent is one or more of types 4A, 5A, 13X, NaY, or ZSM-5.

8. The method of claim 1, further comprising the steps of:

(g) employing an ancillary hot media having a temperature of between about 80° C. and about 500° C.;

(h) contacting said ancillary hot media with a heat-exchange surface, in thermal contact with said adsorbent; said heat-exchange surface to transfer heat from said ancillary hot media to said adsorbent, and to cool said ancillary hot media; and (i) providing said process gas stream at a temperature of between about −20° C. and about 120° C.

9. The method of claim 1, wherein process gas stream is a flue gas stream.

10. The method of claim 1, wherein said SAC is one or more of $CO_2$, $NO_X$, $SO_X$, or mercury.

11. The method of claim 1, wherein step (b) is accomplished by countercurrent contact between said the temperature-adjusted process gas stream and said adsorbent.

12. The method of claim 11, wherein said adsorbent passes downwardly through a vessel fitted with a plurality of horizontally disposed perforated trays for retarding the downward flow of said adsorbent and through which perforations said adsorbent can pass to an adjacent lower tray.

13. A temperature swing adsorption method for removing one or more strongly adsorbed components (SAC) from a process gas stream having SAC and other gaseous components in a continuous flow sealed vessel, which comprises the steps of:

(a) adjusting the temperature of the process gas stream to be between about 80° and about 500° C.;

(b) in a sealed vessel containing a plurality of horizontally disposed perforated trays through which perforations both gas and solids can pass simultaneously, contacting a process gas stream with a first heat-exchange surface in thermal contact with an adsorbent; said first heat-exchange surface to transfer heat from said process gas stream to said adsorbent passed through said sealed vessel and countercurrently to said temperature-adjusted process gas stream, and to cool said process gas stream and optionally remove condensate from said process gas stream should the dewpoint temperature be reached;

(c) optionally passing said cool process gas stream in contact with an external heat exchanger surface through which, on the opposite side, a coolant passes, producing a further cooled process gas stream, between about −20° and about 120° C.;

(d) passing said process gas stream, between about −20° and about 120° C., in direct contact with a cooled section of said adsorbent to adsorb SAC therefrom, producing a SAC-depleted process gas stream and a SAC-laden adsorbent;

(e) partially heating said adsorbent via thermal contact with a second heat-exchange surface, the opposite side of which is in contact with a fluid that has been heated by the hot adsorbent via thermal contact with a third heat-exchange surface, and which is subsequently circulated;

(f) fully heating said adsorbent via thermal contact with said first heat-exchange surface, thus causing adsorbed SAC to be desorbed and withdrawing desorbed SAC for collection;

(g) passing said SAC-depleted adsorbent from step (f) into contact with said third heat-exchange surface, the opposite side of which is in contact with a coolant that has been cooled by the cool adsorbent via thermal contact with the second heat-exchange surface from step (e), and which is subsequently circulated, to cool said coolant sufficiently for return to step (c) of the process; and (h) withdrawing any fines for collection.

14. The method of claim 13, further comprising the step of:

(i) passing said SAC-depleted process gas stream from step (c) into contact with heated regenerated adsorbent from step (b) to cool said SAC depleted adsorbent sufficiently for return to step (c) of the process.

15. The method of claim 13, wherein said adsorbent is one or more of a molecular sieve, alumina, silica gel, activated carbon, or a zeolite.

16. The method of claim 15, wherein said zeolite adsorbent is one or more of types A, D, L, R, S, T, X, Y, ZSM, mordenite, or clinoptilolite.

17. The method of claim 16, wherein said zeolite adsorbent is one or more of types 4A, 5A, 13X, NaY, or ZSM-5.

18. The method of claim 13, further comprising the steps of:

(g) employing an ancillary hot media having a temperature of between about 80° and about 500° C.;

(h) contacting said ancillary hot media with a heat-exchange surface, in thermal contact with an adsorbent; said heat-exchange surface to transfer heat from said ancillary hot media to said adsorbent, and to cool said ancillary hot media; and (i) providing said process gas stream at a temperature of between about −20° and about 120° C.

19. The method of claim 13, wherein process gas stream is a flue gas stream.

20. The method of claim 13, wherein said SAC is one or more of $CO_2$, $NO_X$, $SO_X$, or mercury.

21. The method of claim 13, wherein step (d) is accomplished by counter-current contact between said the temperature-adjusted process gas stream and said adsorbent.

22. The method of claim 21, wherein said adsorbent passes downwardly through a vessel fitting with a plurality of horizontally disposed perforated trays for retarding the downward flow of said adsorbent and through which perforations said adsorbent can pass to an adjacent lower tray.

23. A temperature swing adsorption method for removing a strongly adsorbed component (SAC) from a process gas stream contaminated with said SAC by countercurrent contacting said process gas stream with an adsorbent housed within a vessel, which comprises the steps of:
(a) providing said vessel with a lower gas inlet for a process gas stream to be admitted into said vessel, an upper gas outlet for withdrawal of a product gas stream depleted in said SAC, an upper adsorbent inlet, and a lower adsorbent outlet for withdrawal of spent adsorbent from said vessel;
(b) fitting said vessel with a plurality of horizontally disposed perforated trays for retarding the downward flow of said adsorbent and through which perforations both said process gas stream and said adsorbent can pass countercurrently and simultaneously to an adjacent lower tray;
(c) passing said process gas stream into said vessel through said lower gas inlet;
(d) passing adsorbent into said vessel through said adsorbent inlet;
(e) contacting upwardly flowing process gas stream with said adsorbent as said adsorbent moves downwardly from perforated tray to perforated tray;
(f) withdrawing a SAC-depleted process gas stream from said vessel through said upper gas outlet;
(g) withdrawing spent adsorbent enriched in said SAC from said vessel through said lower adsorbent outlet;
(h) employing heat from heat source for transfer through a surface in contact with said adsorbent enriched in said SAC to cause SAC to desorb for subsequent collection; and
(i) passing said SAC-depleted process gas stream from step (f) into contact with heated regenerated adsorbent from step (h) to cool it sufficiently for return to step (d) of the process.

24. A temperature swing adsorption method for removing a strongly adsorbed component (SAC) from a process gas stream contaminated with said SAC by countercurrent contacting said process gas stream with an adsorbent housed within a vessel, which comprises the steps of:
(a) providing said vessel with a lower gas inlet for a process gas stream to be admitted into said vessel, an upper gas outlet for withdrawal of a product gas stream depleted in said SAC, an upper adsorbent inlet, and a lower adsorbent outlet for withdrawal of spent adsorbent from said vessel;
(b) fitting said vessel with a plurality of horizontally disposed perforated trays for retarding the downward flow of said adsorbent and through which perforations both said process gas stream and said adsorbent can pass countercurrently and simultaneously to an adjacent lower tray;
(c) passing said process gas stream into said vessel through said lower gas inlet;
(d) passing adsorbent into said vessel through said adsorbent inlet;
(e) contacting upwardly flowing process gas stream with said adsorbent as said adsorbent moves downwardly from perforated tray to perforated tray;
(f) withdrawing a SAC-depleted process gas stream from said vessel through said upper gas outlet;
(g) withdrawing spent adsorbent enriched in said SAC from said vessel through said lower adsorbent outlet;
(h) employing heat from heat source for transfer through a surface in contact with said adsorbent enriched in said SAC to cause SAC to desorb for subsequent collection;
(g) employing an ancillary hot media having a temperature of between about 80° and about 500° C.;
(h) contacting said ancillary hot media with a heat-exchange surface, in thermal contact with an adsorbent; said heat-exchange surface to transfer heat from said ancillary hot media to said adsorbent, and to cool said ancillary hot media; and
(i) providing said process gas stream at a temperature of between about −20° and about 120° C.

25. A temperature swing adsorption apparatus for removing a strongly adsorbed component (SAC) from a process gas stream contaminated with said SAC by countercurrent contacting said process gas stream with an adsorbent, which comprises a vessel having:
(i) a lower gas inlet for a process gas stream to admitted into said vessel;
(ii) an upper gas outlet for withdrawal of a product gas stream depleted in said SAC;
(iii) an upper adsorbent inlet;
(iv) a lower adsorbent outlet for withdrawal of spent adsorbent from said vessel;
(v) a plurality of horizontally disposed perforated trays disposed within said vessel for retarding the downward flow of said adsorbent and through which perforations said process gas stream and said adsorbent can pass countercurrently and simultaneously to an adjacent lower tray;
(vi) a return line for conveying adsorbent from said lower adsorbent outlet for returning said adsorbent to said vessel through said upper adsorbent inlet, said return line fitted with a size-selective sieve for removing any fines which may have formed in said vessel;
(vii) an intermediate process gas outlet for withdrawing process gas for its cooling;
(viii) a cooled process gas inlet for admitting cooled product gas for contact with said adsorbent for cooling of said adsorbent; and
(ix) a first heat exchange surface is disposed in said return line (vi) which heat exchange surface is in fluid communication with a second heat exchange surface disposed within said vessel adjacent to said cooled process gas inlet (viii) for cooling said adsorbent withdrawn from said vessel by said return line (vi).

* * * * *